June 12, 1923.
P. C. FRITZ
HAND TRUCK
Original Filed June 12, 1919
1,458,285
2 Sheets-Sheet 1
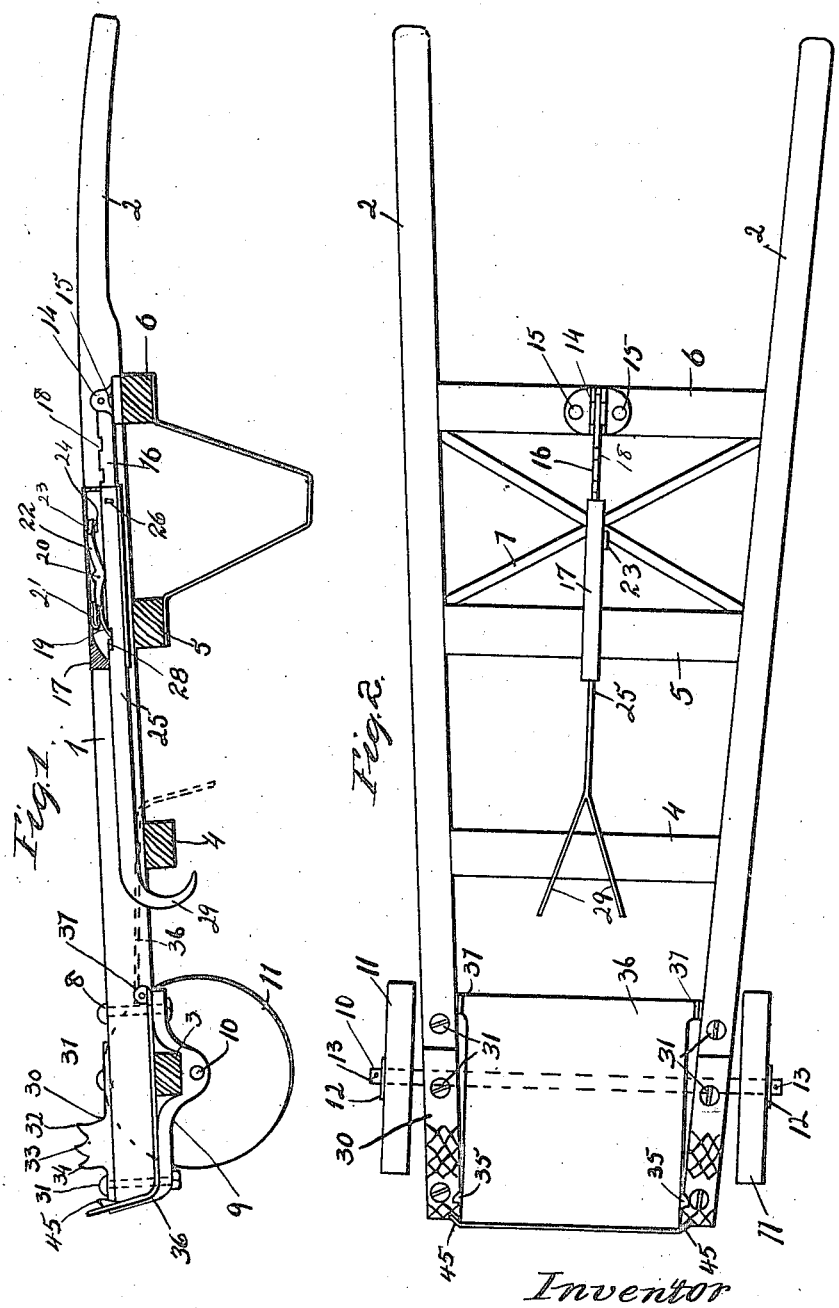
Inventor
Peter C. Fritz
By W. W. Williamson
Atty.

June 12, 1923.
P. C. FRITZ
1,458,285
HAND TRUCK
Original Filed June 12, 1919    2 Sheets-Sheet 2
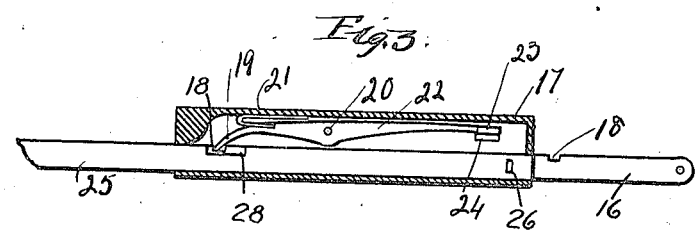
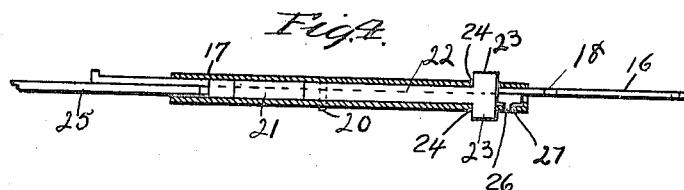
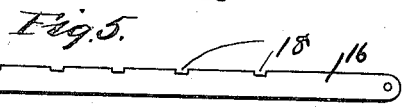
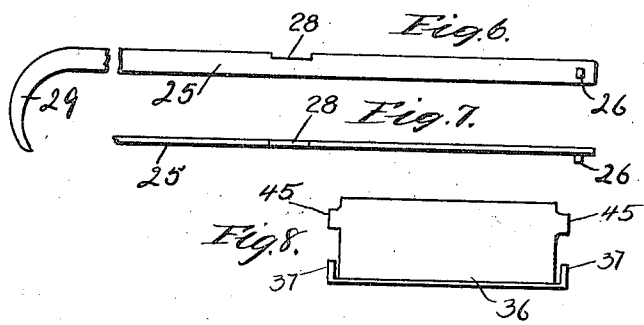
Inventor
Peter C. Fritz
By W. W. Williamson
Atty.

Patented June 12, 1923.

1,458,285

UNITED STATES PATENT OFFICE.

PETER C. FRITZ, OF PHILADELPHIA, PENNSYLVANIA, ASSIGNOR, BY MESNE ASSIGNMENTS, TO PITTSBURGH HAND TRUCK MFG. CO., OF PITTSBURGH, PENNSYLVANIA, A CORPORATION OF DELAWARE.

HAND TRUCK.

Application filed June 12, 1919, Serial No. 303,733. Renewed November 10, 1922. Serial No. 600,189.

*To all whom it may concern:*

Be it known that I, PETER C. FRITZ, a citizen of the United States, residing at Philadelphia, in the county of Philadelphia and State of Pennsylvania, have invented new and useful Improvements in Hand Trucks, of which the following is a specification.

My invention relates to a new and useful improvement in hand trucks, and has for its object to provide a simple and effective means for loading and unloading such a truck with boxes, barrels, or bags and the like without having to use what is known as a hand hook and without undue effort on the part of the truck man.

A further object of my invention is to provide an exceedingly, simple and effective means for adjusting the length of the hook.

A still further object of my invention is to so construct the hook as to provide for its engagement at two points upon the object to be loaded.

A still further object of my invention is to provide for mounting the truck upon a rotary axle upon which the wheels in turn may revolve.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:—

Fig. 1, is a longitudinal section of a hand truck made in accordance with my improvement.

Fig. 2, is a plan view thereof.

Fig. 3, is an enlarged view of the mechanism for adjusting the hook, one face of the casing being removed to show the interior thereof.

Fig. 4, is a section at the line 4—4 of Fig. 3.

Fig. 5, is a side view of the ratchet bar.

Fig. 6, is a similar view of the hook member.

Fig. 7, is an edge view of the hook member.

Fig. 8, is a front view of the device for loading bags, and,

Fig. 9, shows a modification of the toe piece.

In carrying out my invention as here embodied, 1 represents the truck which is composed of handle bars 2 connected together by the cross pieces 3, 4, 5 and 6 and the metal braces 7. To the under side of the handle bars at the forward end thereof are secured by bolts 8 the hangers 9, which as shown in Fig. 1 bridge the strip 3; by which arrangement great rigidity is had for the hangers.

Through suitable bearings in the hangers is passed the axle 10 which is round in cross section in order that the wheels 11 may be placed upon the ends thereof and these wheels are held in place by the washers 12 and the cotter pins 13 thus permitting either the wheels to revolve upon the axle or the axle to revolve in the hangers or both.

To the cross piece 6 is secured a block 14 by means of the screws 15 and within this block is pivoted a ratchet bar 16 which will pass through the pawl casing 17 and has a series of ratchet notches 18 in the upper edge thereof into which the nose of the pawl 19 is adapted to engage. This pawl is pivoted at 20 within the casing 17 and is normally held in engagement with the notches of the ratchet bar by the spring 21.

Extending rearward from the pivot point of the pawl is a tail piece 22 which has projecting therefrom the lugs 23, the latter passing through slots 24 in the sides of the casing 17 so that they may be in easy reach of the operator for disengaging the pawl from the notches of the ratchet bar.

25 represents the hook bar having a lug 26 projecting from one face thereof which latter is adapted to project into the slot 27 in one side of the casing 17 so as to lock this hook bar to the casing causing them to move in unison. This hook bar lies against one face of the ratchet bar 16 and slides thereon when the hook is being adjusted for different reaches.

A notch 28 is formed in the upper edge of the hook bar so as to permit the nose of the pawl to enter into engagement with the ratchet notches 18 as the casing is adjusted upon the ratchet bar.

The hook bar 25 terminates in the two pronged hook 29, said prongs being separated a distance equal to approximately one-third the width of the trucks to give two widely separate gripping points, the object of these prongs being to give a double grip upon the object to be loaded thereby steadying the same when being handled by the truck.

Upon each of the inner ends of the handle bars of the truck are secured the toe pieces 30 by means of the screws 31 and these toe pieces have different height tangs as indicated at 32, 33, 34 and 35 the object being to provide for the proper engagement with the bottom edge of different articles, and in practice this has become to be of great advantage in handling boxes of different sizes and the tangs 35 are especially adapted for handling barrels.

From the foregoing description the operation of my improved truck is run up to the object to be loaded such as a box swing into a substantially vertical position, the toe pieces coming in contact with the lower edge of the box when the hook is swung over the further upper edge of the box so as to engage with the opposite side thereof from the truck, and the hook bar adjusted by sliding it forward and back on the ratchet bar until the proper length is obtained and when by swinging the truck downward by sufficient pull upon the handles the object will be loaded requiring no direct lifting and thus greatly facilitating such operations.

To whatever length the hook is adjusted it will be held by the engagement of the pawl with one of the notches of the ratchet bar until readjusted by disengaging the pawl and readjusting the device.

In order that my device may be also adapted for loading bags of material I provide a scoop 36 which is pivoted at 37 between the handle bars of the truck and when not in use is swung to the position shown in dotted lines in Fig. 1, lying over and resting upon the cross piece 4, but when it is desired to utilize the same it is swung to the position shown in full lines in Figs. 1 and 2, the lugs 45 at the side of the lip coming in contact with the toe pieces 30 thereby holding the scoop in its operative position. The use of this scoop facilitates the handling of bagged material since it is only necessary to run the truck along side of the bag, swinging its handles up to a substantially vertical position, bringing the scoop into contact with the bag where it is resting upon the floor, engaging the hook with said bag and swing the truck down which will load the bag thereon with little or no effort upon the part of the operator.

The toe piece may be constructed as shown in Fig. 9 in which case the tangs 32, 33 and 34 may be carried upon a separate block 39, which is adjusted to be inserted in the socket 40 formed on the toe piece.

Of course I do not wish to be limited to the exact details of construction as herein shown as these may be varied within the limits of the appended claim without departing from the spirit of my invention.

Having thus fully described my invention, what I claim as new and useful is:—

In combination with a hand truck a ratchet bar and casing being adapted to slide upon said bar, a spring actuated pawl enclosed within said casing, lugs projecting from the tail of the pawl through the sides of the casing for hand manipulation, a hook bar attached to said casing so as to move therewith when the latter is slid upon the ratchet bar, and a two pronged hook formed upon said hook bar.

In testimony whereof, I have hereunto affixed my signature.

PETER C. FRITZ.